(12) United States Patent
Kataoka

(10) Patent No.: US 7,608,980 B2
(45) Date of Patent: Oct. 27, 2009

(54) VIBRATION CONTROL APPARATUS AND METHOD

(75) Inventor: Kenichi Kataoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 11/837,260

(22) Filed: Aug. 10, 2007

(65) Prior Publication Data

US 2008/0054760 A1    Mar. 6, 2008

(30) Foreign Application Priority Data

Sep. 5, 2006    (JP)    ............... 2006-240657

(51) Int. Cl.
*H01L 41/08*    (2006.01)
(52) U.S. Cl. .............. 310/317; 310/316.02; 310/323.02
(58) Field of Classification Search ............ 310/323.04, 310/323.06, 316.02
See application file for complete search history.

(56) References Cited

U.S. PATENT DOCUMENTS

| | | | | |
|---|---|---|---|---|
| 4,513,219 A | * | 4/1985 | Katsuma et al. | 310/328 |
| 4,560,263 A | * | 12/1985 | Katsuma et al. | 396/133 |
| 4,794,294 A | * | 12/1988 | Shimizu et al. | 310/316.02 |
| 4,954,742 A | * | 9/1990 | Izukawa | 310/316.02 |
| 5,001,404 A | * | 3/1991 | Kataoka | 318/116 |
| 5,406,160 A | * | 4/1995 | Shirasaki | 310/323.06 |
| 5,886,455 A | | 3/1999 | Tsukimoto | |
| 6,084,335 A | * | 7/2000 | Tamai | 310/316.02 |

FOREIGN PATENT DOCUMENTS

| | | |
|---|---|---|
| JP | 4-150781 A | 5/1992 |
| JP | 06-327271 A | 11/1994 |
| JP | 2003-333391 A | 11/2003 |

\* cited by examiner

*Primary Examiner*—Mark Budd
(74) *Attorney, Agent, or Firm*—Rossi, Kimms & McDowell, LLP

(57) ABSTRACT

A vibration control apparatus capable of efficiently generating vibrations of different orders using the same electrodes. A plurality of electrodes polarized to have desired polarities are formed in a piezoelectric element, and are divided into a plurality of electrode groups each comprised of electrodes including two or more electrodes with different polarities. Phases and frequency of alternating voltages applied to the electrode groups are changed, thereby generating vibrations of different orders.

8 Claims, 12 Drawing Sheets

FIG.14

| | VIBRATION WAVEFORM 24 | VIBRATION WAVEFORM 25 | VIBRATION WAVEFORM 26 |
|---|---|---|---|
| SIGNAL PA | + | + | + |
| SIGNAL PB | − | + | + |
| SIGNAL PC | + | − | + |
| SIGNAL PD | − | − | + |

VIBRATION CONTROL APPARATUS AND METHOD

BACKGROUND OF THE INVENTION

1. Field of the Invention

The present invention relates to a vibration control apparatus and method for controlling generation of a vibration wave in an electrostrictive element.

2. Description of the Related Art

Conventionally, there have been known vibration wave actuators such as ultrasonic wave motors. A vibration wave actuator of this kind includes an electrostrictive element, such as a piezoelectric element, which is adapted to generate mechanical vibration when applied with an alternating voltage. The resultant vibration energy is utilized for production of a driving force.

Other vibration wave actuators have also been realized, which are adapted to excite a higher-order vibration mode (see, Japanese Laid-open Patent Publications Nos. 6-327271 and 2003-333391). To improve the startability, the vibration wave actuator disclosed in Japanese Laid-open Patent Publication No. 6-327271 generates, at the time of startup, vibration different from vibration of a primary drive mode.

In order to remove dust adhered around an image pickup element, the actuator disclosed in Japanese Laid-open Patent Publication No. 2003-333391 includes a piezoelectric element, which is disposed on an optical element located at a front surface of the image pickup element and adapted to vibrate with at least two resonance frequencies in sequence.

In the actuators disclosed in Japanese Laid-open Patent Publications Nos. 6-327271 and 2003-333391, however, the electrostrictive element is only provided with electrodes designed in correspondence to a mode shape of a predetermined order vibration mode, but not provided with electrodes corresponding to mode shapes of higher-order vibration modes. For this reason, the vibration efficiency of the actuators is lowered when a vibration mode other than the predetermined mode is excited using the electrodes formed in the electrostrictive element.

On the other hand, in order to provide an electrostrictive element with electrodes corresponding to mode shapes of higher-order vibration modes, a plurality of electrostrictive element parts each formed with electrodes in correspondence to a mode shape concerned must be stacked into one piece, for example, resulting in decrease in the utilization efficiency of the electrostrictive element.

In the actuators disclosed in Japanese Laid-open Patent Publications Nos. 6-327271 and 2003-333391, the electrodes are provided solely at positions of loops in the mode shape of a predetermined order vibration mode, making it impossible to directly excite vibrations at positions of loops in a mode shape of another order vibration mode.

SUMMARY OF THE INVENTION

The present invention provides a vibration control apparatus and method capable of efficiently generating a plurality of vibrations of different orders using the same electrodes.

According to a first aspect of the present invention, there is provided a vibration control apparatus for controlling vibration of a vibration member having an electrostrictive element adapted to be excited when applied with alternating voltages, comprising an instruction unit adapted to give an instruction to specify an order of vibration in which the vibration member vibrates, and a changeover unit adapted to change over phases of alternating voltages applied to a plurality of electrode groups in accordance with the order of vibration specified by the instruction unit, the plurality of electrode groups being grouped from a plurality of electrodes formed on the electrostrictive element and polarized into respective polarities, each of the electrode groups being comprised of at least one electrode and at least one other electrode which are different in polarity from each other.

According to a second aspect of the present invention, there is provided a vibration control method for controlling vibration of a vibration member having an electrostrictive element adapted to be excited when applied with alternating voltages, comprising a vibration generation step of generating vibrations of different orders by changing over phases of alternating voltages applied to a plurality of electrode groups that are grouped from a plurality of electrodes formed on the electrostrictive element and polarized into respective polarities, each of the electrode groups being comprised of at least one electrode and at least one other electrode which are different in polarity from each other.

With the present invention, it is possible to form ideal polarization patterns on the electrostrictive element for vibration modes of different orders using the same electrode pattern by simply changing over phases of alternating voltages applied to the electrostrictive element. This makes it possible to efficiently generate vibrations of different orders using the same electrodes.

Further features of the present invention will become apparent from the following description of exemplary embodiments with reference to the attached drawings.

BRIEF DESCRIPTION OF THE DRAWINGS

FIGS. 3A and 3B are views showing waveforms of excitation signals outputted from a mode changeover unit in FIG. 2, wherein FIG. 3A shows a set of waveforms and FIG. 3B shows another set of waveforms;

FIGS. 4A to 4D are views for schematically explaining the principle of movement of a movable member, which is moved according to excitation signals shown in FIGS. 3A and 3B, wherein FIGS. 4A and 4B show third-order bending vibration, whereas FIGS. 4C and 4D show fourth-order bending vibration;

FIGS. 10A and 10B are views showing excitation signal waveforms in the third embodiment, wherein FIG. 10A shows third-order bending vibration and FIG. 10B shows second-order bending vibration;

FIGS. 11A to 11D are views for schematically explaining the principle of movement of a movable member, which is moved according to the excitation signals shown in FIGS. 10A and 10B, wherein FIGS. 11A and 11B show the motion loci of contact members in third-order bending vibration, whereas FIGS. 11C and 11D show the motion loci of the contact members in second-order bending vibration;

FIG. 14 is a view showing the signs of phases of excitation signals in the fourth embodiment.

DETAILED DESCRIPTION OF THE PREFERRED EMBODIMENTS

The present invention will now be described in detail below with reference to the drawings showing preferred embodiments thereof.

First Embodiment

Figure 1:
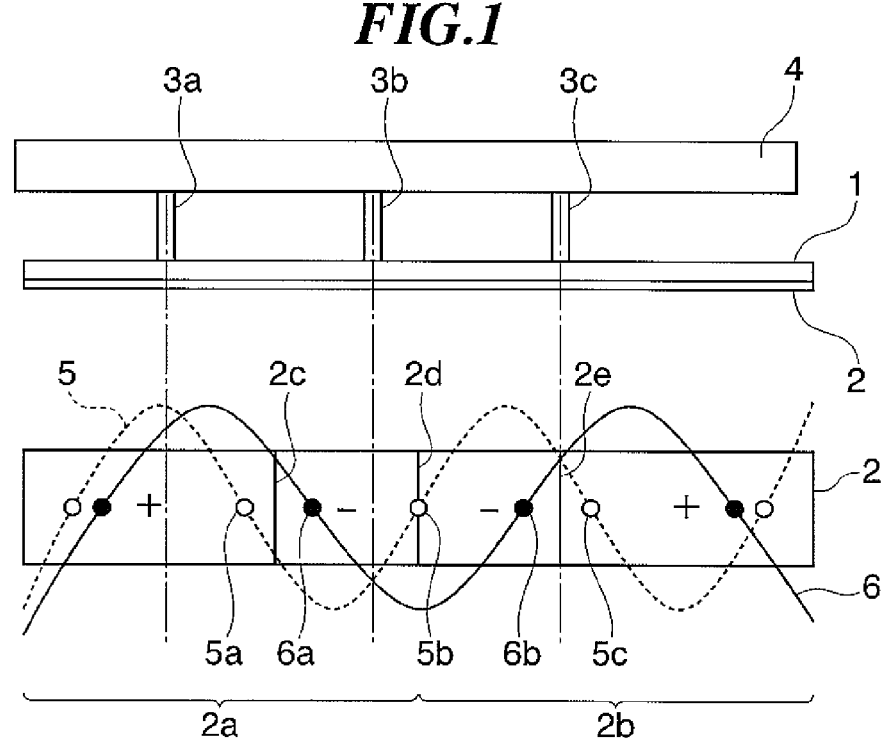
FIG. 1 is a view showing electrodes of a piezoelectric element of a vibration wave actuator, which is a control object of a vibration control apparatus according to a first embodiment of the present invention.

FIG. 1 is a view showing electrodes of a piezoelectric element of a vibration wave actuator that is a control object of a vibration control apparatus according to a first embodiment of the present invention. In an upper half of FIG. 1, there is shown the actuator as seen from side. In a lower half of FIG. 1, there are shown the piezoelectric element as seen from bottom and two vibration waveforms as viewed in a thickness direction of the piezoelectric element. The vibration wave actuator is configured in the form of a linear-driven vibration wave actuator.

The actuator includes a piezoelectric element 2 formed into a rectangular plate shape. The piezoelectric element 2 has one surface thereof to which an elastic member 1 is affixed by adhesive. The elastic member 1 is formed with protrusions 3a to 3c on which a movable unit 4 is disposed. The movable unit 4 is made in contact with the protrusions 3a to 3c by means of a pressurization member, not shown. In other words, the movable unit 4 is supported by the protrusions 3a to 3c for movement in a left-to-right direction as viewed in FIG. 1.

The piezoelectric element 2 is formed at its another surface with a plurality of electrodes that are divided into two electrode groups 2a, 2b. Each of the electrode groups 2a, 2b includes two electrodes that are different in polarity from each other. The electrode groups 2a, 2b are each polarized with positive and negative polarities in the thickness direction of the piezoelectric element 2, as shown in FIG. 1.

The piezoelectric element 2 is excited when applied at the electrode groups 2a, 2b with predetermined alternating voltages. When the piezoelectric element 2 is excited, the elastic member 1 vibrates. In such a vibration mode, there is produced a vibration waveform 5 shown by a broken line in FIG. 1 or a vibration waveform 6 shown by a solid line.

It should be noted that the vibration waveforms 5, 6 each represent a bending vibration, more specifically, a bending vibration in the thickness direction of the piezoelectric element 2. The vibration waveforms 5, 6 are switchingly generated using a drive circuit, which will be described later.

Open circle marks 5a to 5c on the vibration waveform 5 represent vibration node positions. Similarly, filled circle marks 6a, 6b on the vibration waveform 6 represent vibration node positions.

In a region of the electrode group 2a, an inter-electrode boundary 2c in the electrode group 2a is formed at a location nearly intermediate between the vibration node position 5a in the vibration waveform 5 and the vibration node position 6a in the vibration waveform 6. Similarly, in a region of the electrode group 2b, an inter-electrode boundary 2e in the electrode group 2b is formed at a location nearly intermediate between the vibration node position 6b in the vibration waveform 6 and the vibration node position 5c in the vibration waveform 5. Furthermore, there is provided an inter-electrode-group boundary 2d between the regions of the electrode groups 2a, 2b. The inter-electrode-group boundary 2d between the electrode groups is formed at a node position in the vibration waveform 5.

Figure 2:
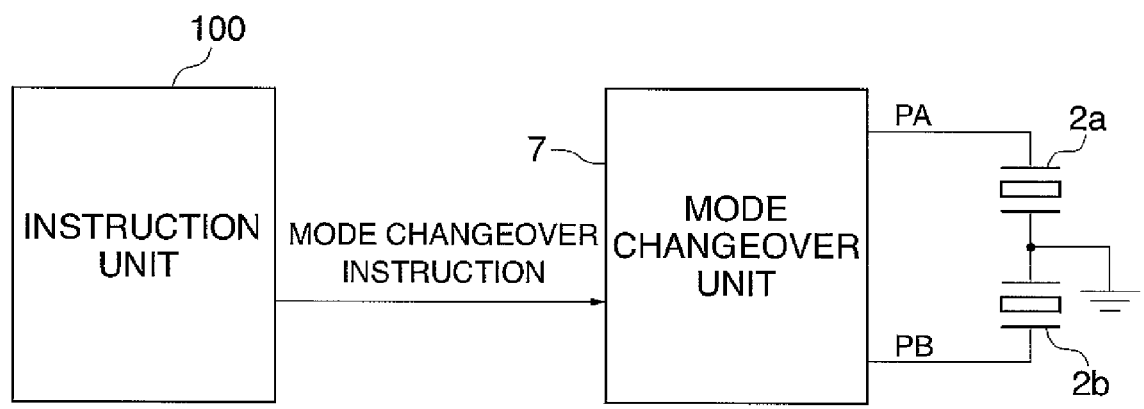
FIG. 2 is a block diagram showing a vibration mode changeover part of the vibration control apparatus shown in FIG. 1.

FIG. 2 is a block diagram showing a vibration mode changeover part of the vibration control apparatus. The vibration control apparatus includes a mode changeover unit 7 adapted to perform changeover between two vibrations of different orders in response to a mode changeover instruction from an instruction unit 100.

The mode changeover unit 7 supplies an excitation signal PA to the electrode group 2a, and supplies an excitation signal PB to the electrode group 2b. In actuality, the excitation signals PA, PB are alternating voltages of a frequency near a resonance frequency of each vibration mode, as shown in FIGS. 3A and 3B.

Figure 3A:
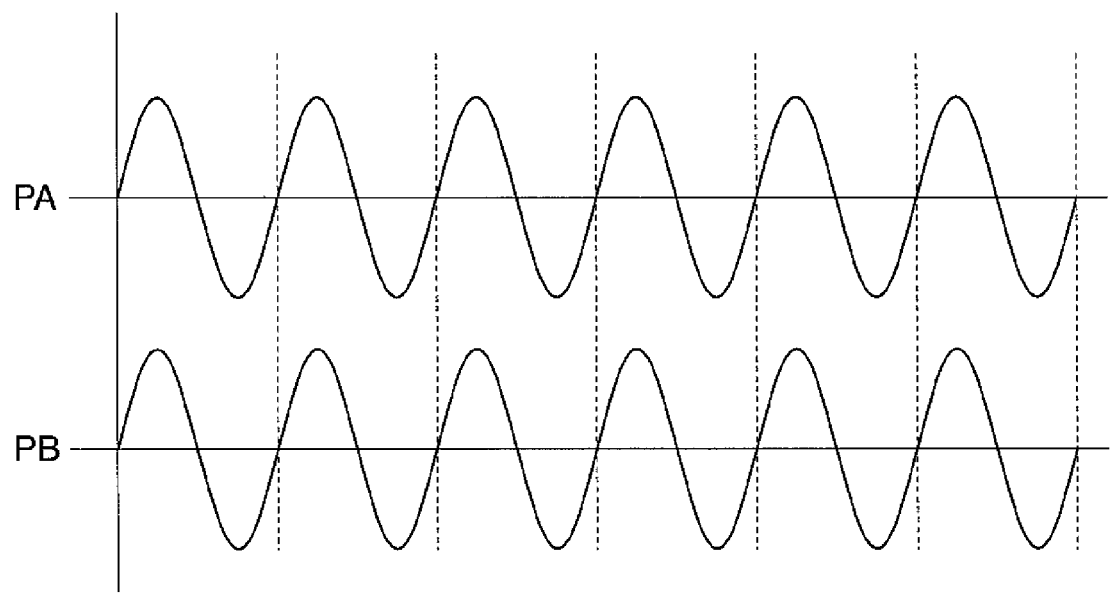

FIG. 3A shows an excited state corresponding to the vibration waveform 6. To generate a vibration of the vibration waveform 6, the mode changeover unit 7 outputs in-phase excitation signals PA, PB to the electrode groups 2a, 2b, respectively, as shown in FIG. 3A. As a result, the elastic member 1 is excited to generate a third-order bending vibration.

Figure 3B:
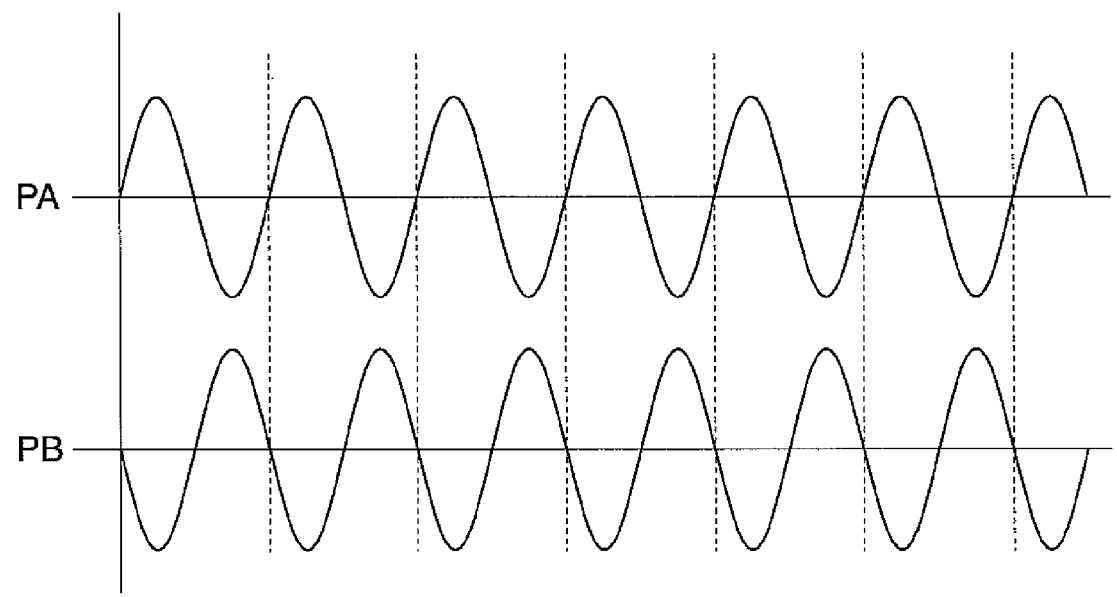

FIG. 3B shows an excited state corresponding to the vibration waveform 5. To generate a vibration of the vibration waveform 5, the mode changeover unit 7 outputs anti-phase excitation signals PA, PB to the electrode groups 2a, 2b as shown in FIG. 3B, whereby the elastic member 1 is excited to generate a fourth-order bending vibration. It should be noted that the excitation frequency for the fourth-order bending vibration is higher than that for the third-order bending vibration.

Figure 4A:
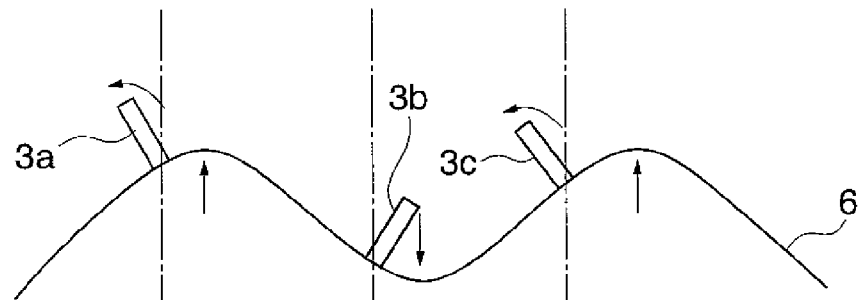
Figure 4B:
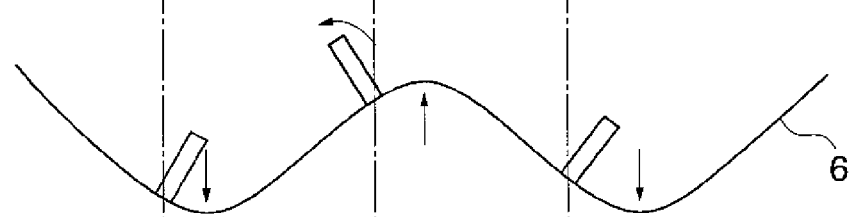
Figure 4C:
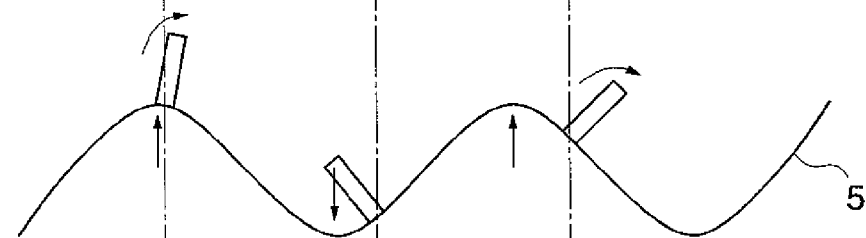
Figure 4D:
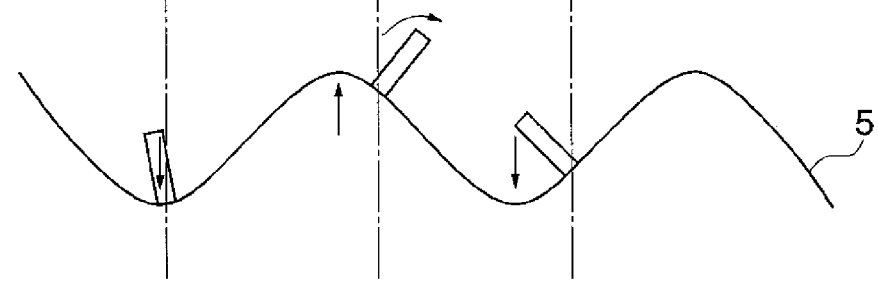

FIGS. 4A and 4B show the motion loci of contact members 3a to 3c observed when a third-order bending vibration is generated in the elastic member 1. FIGS. 4C and 4D show the motion loci of the contact members 3a to 3c observed when a fourth-order bending vibration is generated in the elastic member 1.

In a case where the elastic member 1 performs a third-order bending vibration as shown in FIGS. 4A and 4B, when the vibration occurs in a direction of lifting up the movable unit 4, the contact members 3a to 3c are made inclined in the direction from right to left. As a result of the inclination, the movable unit 4 in pressure-contact with the contact members 3a to 3c is caused to move in the direction from right to left. On the other hand, when the vibration occurs in a direction away from the movable unit 4, the contact members 3a to 3c are inclined in the direction from left to right. In such a case, the contact members 3a to 3c are not made in contact with the movable unit 4 and do not affect the movement of the movable unit 4.

In a case where the elastic member 1 performs a fourth-order bending vibration as shown in FIGS. 4C and 4D, when the vibration occurs in the direction of lifting up the movable unit 4, the contact members 3a to 3c are inclined in the direction from left to right. As a result of the inclination, the movable unit 4 in contact with the contact members 3a to 3c is caused to move in the direction from left to right. On the other hand, when the vibration occurs in the direction away from the movable unit 4, the contact members 3a to 3c are inclined in the direction from right to left. In this case, the contact members 3a to 3c are not in contact with the movable unit 4, and therefore do not affect the movement of the movable unit 4.

As apparent from the foregoing description, in the first embodiment, the moving direction of the movable unit 4 can be changed by changing the vibration mode of the elastic member 1 between the third-order bending vibration and the fourth-order bending vibration.

In other words, this embodiment is arranged such that the polarization direction of part of the electrode groups is equivalently reversed by changing a phase relation between the alternating voltages applied to the electrode groups, whereby a polarization pattern of the entire piezoelectric element is made close to an ideal polarization pattern suitable for a different vibration mode. This makes it possible to achieve polarization patterns close to ideal polarization patterns of the piezoelectric element in different vibration modes using the same electrode pattern, without the need of using dedicated electrodes (electrode pattern). As a consequence, it is possible to effectively utilize the piezoelectric element and reduce the area of the piezoelectric element required to attain the same excitation force.

Furthermore, in the first embodiment, the inter-electrode boundary 2c or 2e between adjacent electrodes in the same electrode group is formed between nodes of different vibration modes, which are close in position to each other. As a result, substantially the same reduction in excitation efficiency can be obtained between the different vibration modes, thus making it possible to enhance the overall excitation efficiency.

It should be noted that in the first embodiment, the phase difference between the excitation signals PA, PB is changed over between in-phase and anti-phase states. However, the phase difference may not have an exact anti-phase relation, but may be equal to 90 degrees. Even in that case, two vibration modes can be switchingly generated.

Second Embodiment

Figure 5:
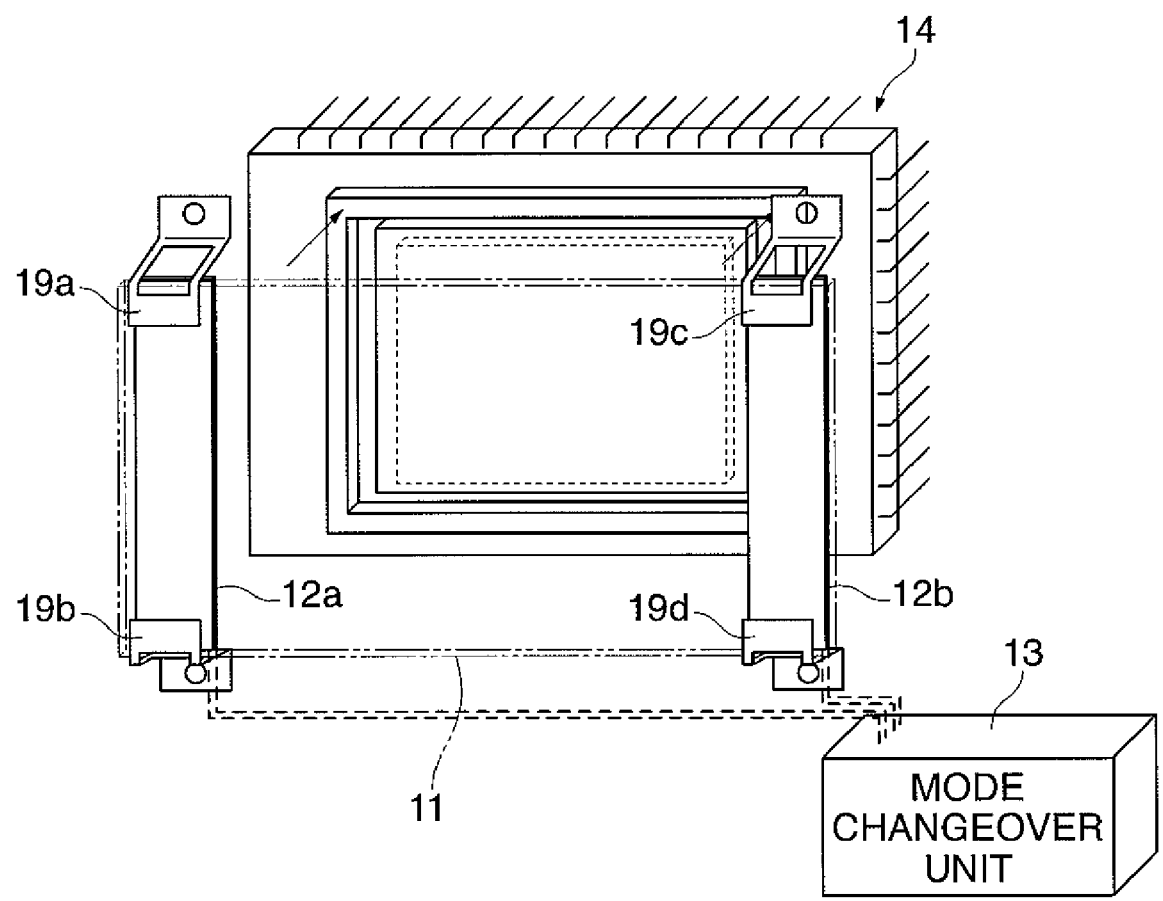
FIG. 5 is an exploded perspective view showing an image pickup element to which is applied a vibration control apparatus according to a second embodiment of the present invention.

FIG. 5 is an exploded perspective view showing part around an image pickup element to which is applied a vibration control apparatus according to a second embodiment of the present invention. The image pickup element package 14 has its front surface on which an optical filter 11 is disposed. The optical filter 11 has an image-pickup-element-side surface having left and right edge portions thereof to which rectangular shaped piezoelectric elements 12a, 12b are affixed by adhesive. The optical filter 11 has an object-side surface thereof to which are affixed by adhesive elastic members 19a to 19d disposed at positions facing upper and lower end portions of the piezoelectric elements 12a, 12b.

End portions of the elastic members 19a to 19d on the side away from the just-mentioned adhesion parts are fixed to the image pickup element package 14 using screws or the like. A mode changeover unit 13 is connected to the piezoelectric elements 12a, 12b.

Figure 6:
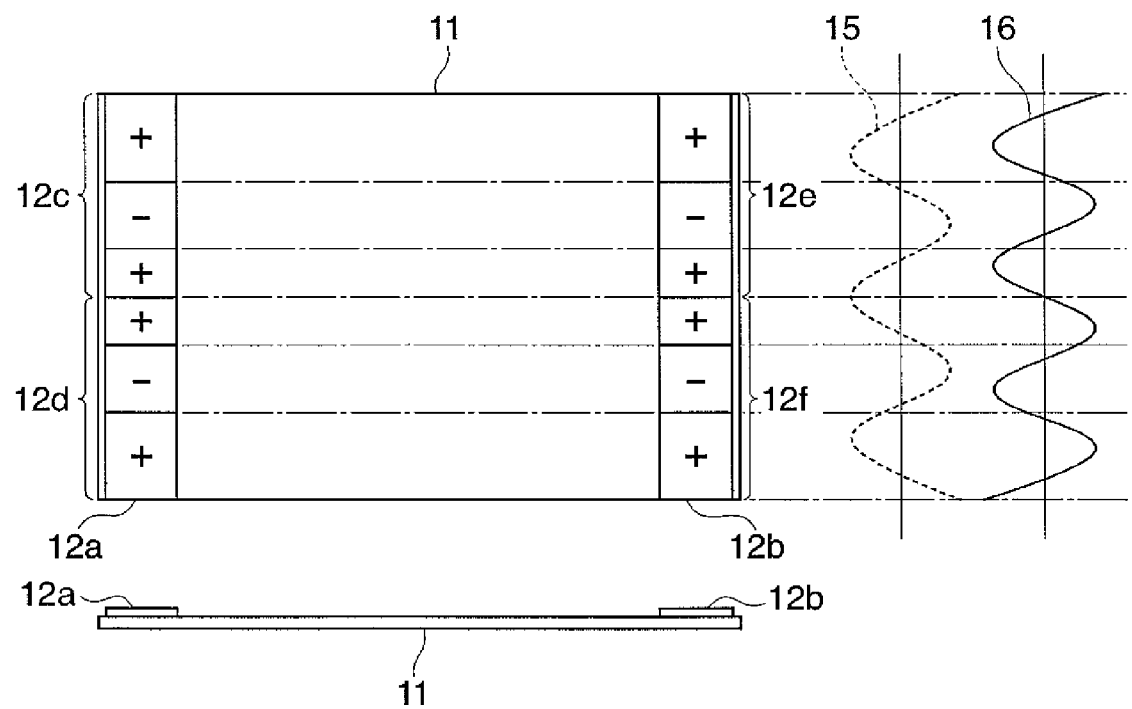
FIG. 6 is a view showing electrode patterns of piezoelectric elements provided in an optical filter shown in FIG. 5.

FIG. 6 is a view showing electrode patterns in the piezoelectric elements provided in the optical filter 11 shown in FIG. 5. The optical filter 11 is formed by lithium niobate, quartz crystal, and the like, which are affixed to one another by adhesive. The piezoelectric elements 12a, 12b are provided for excitation of the optical filter 11 so that dust adhered to the optical filter 11 may be removed. Each of the piezoelectric elements 12a, 12b includes two electrode groups. Specifically, the piezoelectric element 12a is formed with electrode groups 12c, 12d, whereas the piezoelectric element 12b is formed with electrode groups 12e, 12f.

Each of the electrode groups 12c, 12d, 12e, 12f is comprised of three electrodes. In the three electrodes, a central electrode is opposite in polarization direction (polarity) to that of the electrodes disposed at both ends of the electrode group. Adjacent electrodes of different electrode groups (electrodes respectively belonging to different electrode groups and disposed to face each other at opposite edges of the optical filter 11) are the same in the polarization direction (polarity).

With the arrangement where adjacent electrodes of different electrode groups are the same in polarization direction, it is possible to prevent a gap between the adjacent electrodes of the different electrode groups from being polarized during the polarization process. As a result, it is possible to decrease an excitation force caused by electric field generated between the different electrode groups when the alternating voltages applied to the adjacent electrode groups are not in an in-phase relation, thus making it possible to prevent undesired vibration from being superimposed.

By applying the alternating voltages, in a mode described later, to the electrode groups 12c, 12d on the piezoelectric element 12a, it is possible to generate a fifth-order bending vibration in the optical filter 11, as shown by a vibration waveform 15. By applying the alternating voltages, in a mode described later, to the electrode groups 12e, 12f on the piezoelectric element 12b, it is possible to generate a sixth-order bending vibration in the optical filter 11 as shown by a vibration waveform 16.

Figure 7:
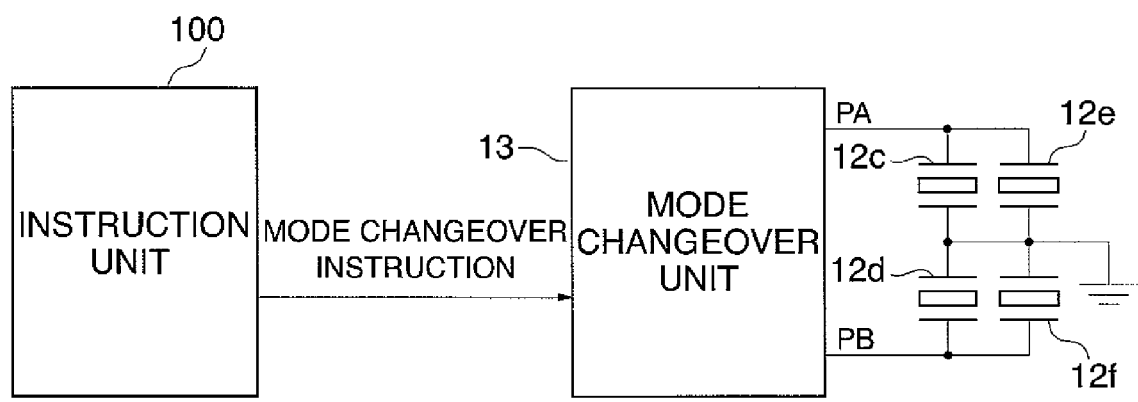
FIG. 7 is a block diagram showing a vibration mode changeover part of the vibration control apparatus according to the second embodiment.

FIG. 7 is a block diagram showing a vibration mode changeover part of the vibration control apparatus according to the second embodiment. The vibration control apparatus includes a mode changeover unit 13 adapted to make changeover between two vibrations of different orders in response to a mode changeover instruction from an instruction unit 100.

The mode changeover unit 13 supplies an excitation signal PA to the electrode groups 12c, 12e, and supplies an excitation signal PB to the electrode groups 12d, 12f. In actuality, as shown in FIG. 8, the excitation signals PA, PB are alternating voltages having a frequency near a resonance frequency of each vibration mode.

Figure 8:
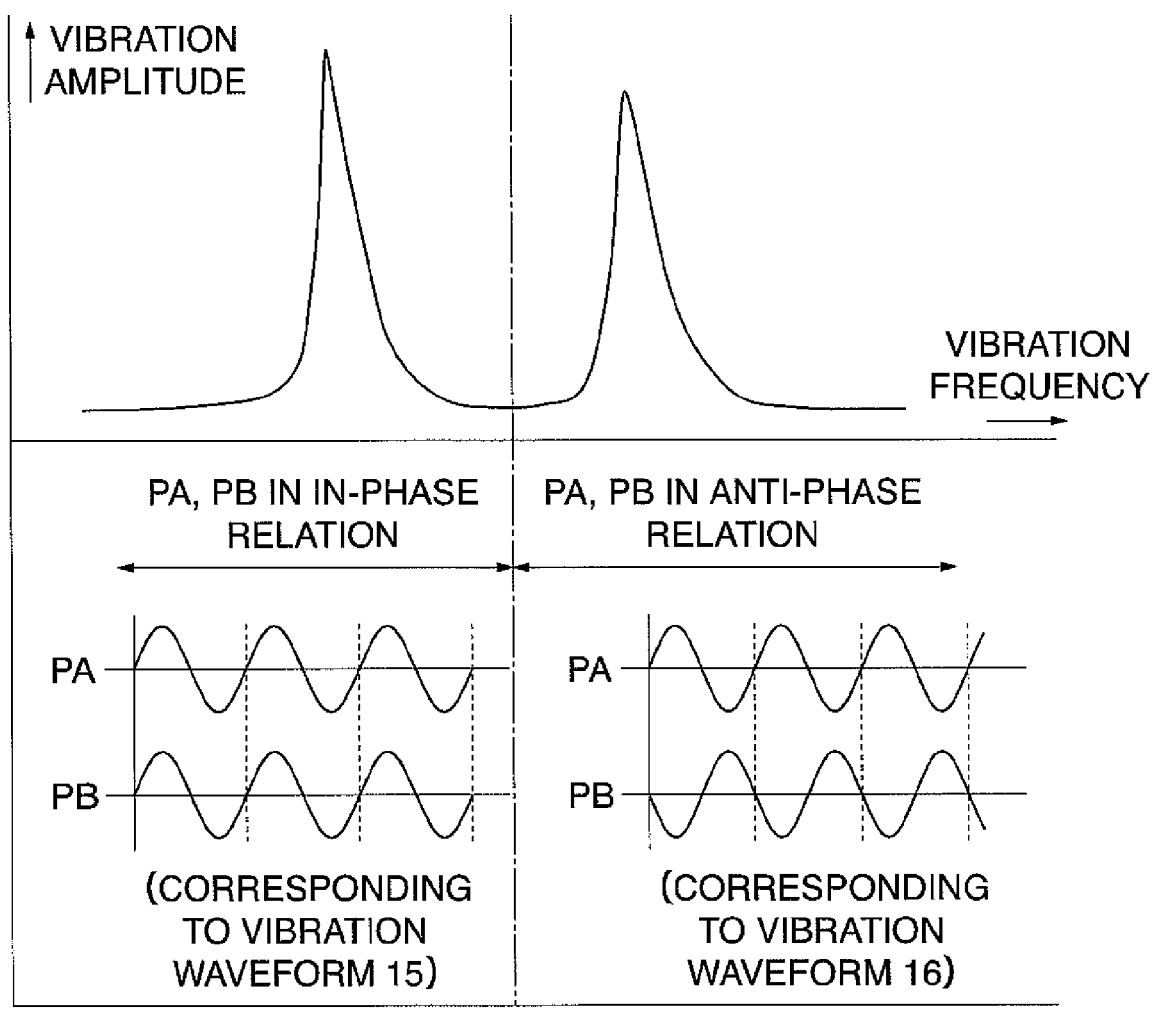
FIG. 8 is a view showing a relation between excitation frequency and excitation amplitude in the second embodiment.

FIG. 8 is a view showing a relation between vibration amplitude in the fifth- and sixth-order vibration modes and excitation frequency. The fifth-order bending vibration (vibration waveform 15) can be generated by supplying the excitation signals PA, PB, which are in in-phase relation, to the piezoelectric elements 12a, 12b. The sixth-order bending vibration (vibration waveform 16) can be generated by supplying the excitation signals PA, PB, which are in anti-phase relation, to the piezoelectric elements 12a, 12b.

It should be noted that, as shown in FIG. 8, a resonance frequency of the fifth-order bending vibration (vibration waveform 15) is lower than that of the sixth-order bending vibration (vibration waveform 16). Such vibration characteristic of the piezoelectric element can vary according to a change in environmental temperature and a fabrication variation. Therefore, the driving frequency, i.e., the frequency of the excitation signals PA, PB, may be changed by sweeping the same within a predetermined range. At that time, the signals PA, PB may be changed over between the in-phase relation and the anti-phase relation on both sides of a predetermined frequency. This makes it possible to carry out the changeover between the two vibration modes, while ensuring ideal vibration.

In a case where dust adhered to the optical filter 11 is removed using a single vibration mode, dust at locations near vibration nodes cannot be fully removed. With the arrangement as described in the second embodiment in which vibrations of different orders are combined or switchingly generated, it is possible to cause the entire surface of the optical filter 11 to vibrate as uniformly as possible. The resultant whole surface vibration can increase the possibility that dust adhered in a wide range of the optical filter 11 can completely be removed.

It should be noted that in the second embodiment, the vibration mode changeover is performed by performing changeover between the in-phase relation and the anti-phase relation and by changing the excitation frequency. However, the both vibration modes may simultaneously be excited.

Third Embodiment

Figure 9:
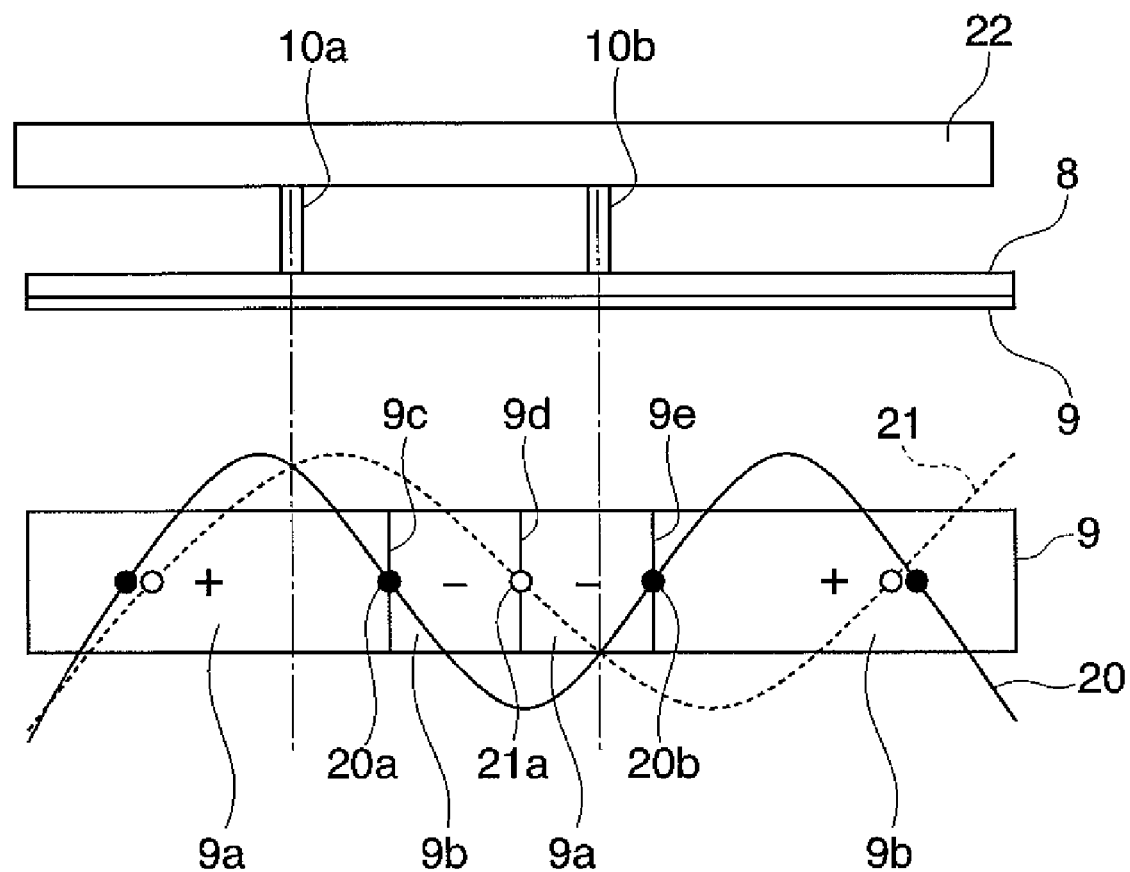
FIG. 9 is a view showing electrodes of a piezoelectric element of a vibration wave actuator, which is a control object of a vibration control apparatus according to a third embodiment of the present invention.

FIG. 9 is a view showing electrodes of a piezoelectric element of a vibration wave actuator, which is a control object of a vibration control apparatus according to a third embodiment of the present invention.

In the first embodiment, the moving direction of the movable unit 4 is changed using third- and fourth-order bending vibrations. Contrary to this, in the third embodiment, the moving direction of a movable member 22 is changed using second- and third-order bending vibrations.

Furthermore, in the first embodiment, a plurality of electrodes in one electrode group are disposed adjacent to one another. In other words, in the first embodiment, the plurality of electrodes forming one electrode group are collectively formed in a given region. On the contrary, in the third embodiment, electrodes belonging to one electrode group are formed such that they are not disposed adjacent to one another. In other words, in the third embodiment, a plurality of electrodes forming one electrode group are not collectively formed in a given region. Instead, electrodes belonging to different electrode groups are mixedly formed in that region.

Referring to FIG. 9, a piezoelectric element 9 is formed into a rectangular plate shape. The piezoelectric element 9 has one surface thereof to which the elastic member 8 is affixed by adhesive. The elastic member 8 is provided with protrusions 10*a*, 10*b* which are spaced apart from each other. A movable member 22 is disposed on the protrusions 10*a*, 10*b* and made in contact therewith by means of a pressurization member, not shown. Thus, the movable member 22 is supported by the protrusions 10*a*, 10*b* for movement in the left-to-right direction as viewed in FIG. 9.

The piezoelectric element 9 has another surface thereof formed with a plurality of electrodes, which are divided into two electrode groups 9*a*, 9*b*. Each of the electrode groups 9*a*, 9*b* includes two electrodes which are different in polarity. As shown in FIG. 9, the electrode groups 9*a*, 9*b* are each polarized with positive and negative polarities in the thickness direction of the piezoelectric element 9.

In a region in which are formed electrodes having positive and negative polarities and belonging to the electrode group 9*a*, electrodes with negative polarity belonging to the electrode group 9*b* are mixedly formed. In a region in which are formed electrodes having positive and negative polarities and belonging to the electrode group 9*b*, electrodes with negative polarity belonging to the electrode group 9*a* are mixedly formed.

By applying predetermined alternating voltages to the electrode groups 9*a*, 9*b*, the piezoelectric element 9 is excited. When the piezoelectric element 9 is excited, the elastic member 8 vibrates. In such vibration mode, a vibration waveform 20 or 21 shown in FIG. 9 is generated.

It should be noted that the vibration waveforms 20, 21 respectively represent vibration waveforms of second- and third-order bending vibrations in the thickness direction of the piezoelectric element 9. Vibrations of the vibration waveforms 20, 21 are switchingly generated by means of a driving circuit (not shown), as with the case described with reference to FIG. 2.

Filled circle marks 20*a*, 20*b* and other like marks on the vibration waveform 20 respectively represent vibration node positions. Similarly, an open circle mark 21*a* and other like marks on the vibration waveform 21 represent vibration node positions.

In the first embodiment, inter-electrode boundaries 2*c*, 2*e* between adjacent electrodes in the same electrode group are each located at a location between nodes of different vibration modes positioned close to each another. Contrary to this, in the third embodiment, as shown in FIG. 9, inter-electrode boundaries 9*c*, 9*e* between adjacent electrodes respectively belonging to different electrode groups are located at node positions of third-order vibration waveform 20. It should be noted that the inter-electrode-group boundary 9*d* between different electrode groups is positioned at a node position of a predetermined vibration waveform, as with the case of the first embodiment.

Figure 10A:
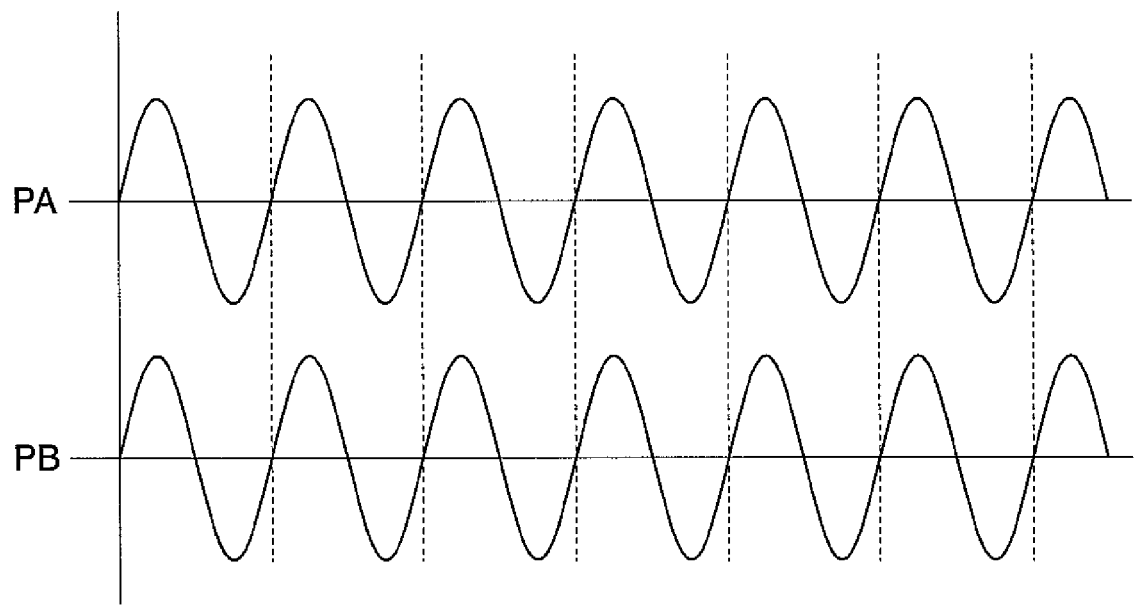

FIG. 10A shows an excited state corresponding to the vibration waveform 20. In order to generate a vibration of the vibration waveform 20, the mode changeover unit outputs in-phase excitation signals PA, PB to the electrode groups 9*a*, 9*b* as shown in FIG. 10A. As a result, the elastic member 8 is excited in a third-order bending vibration.

Figure 10B:
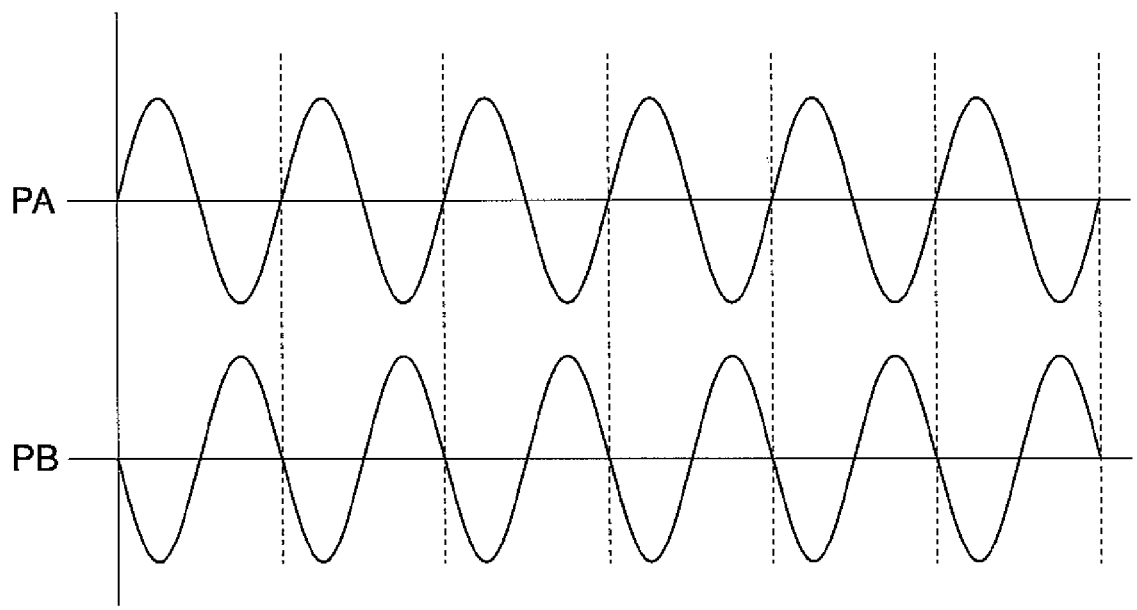

FIG. 10B shows an excited state relating to the vibration waveform 21. To generate a vibration of the vibration waveform 21, the mode changeover unit outputs anti-phase excitation signals PA, PB to the electrode groups 9*a*, 9*b* as shown in FIG. 10B. As a result, the elastic member 8 is excited in a second-order bending vibration. It should be noted that the excitation frequency to attain the second-order bending vibration is lower than that to attain the third-order bending vibration.

Figures 11A, 11B, 11C, 11D:
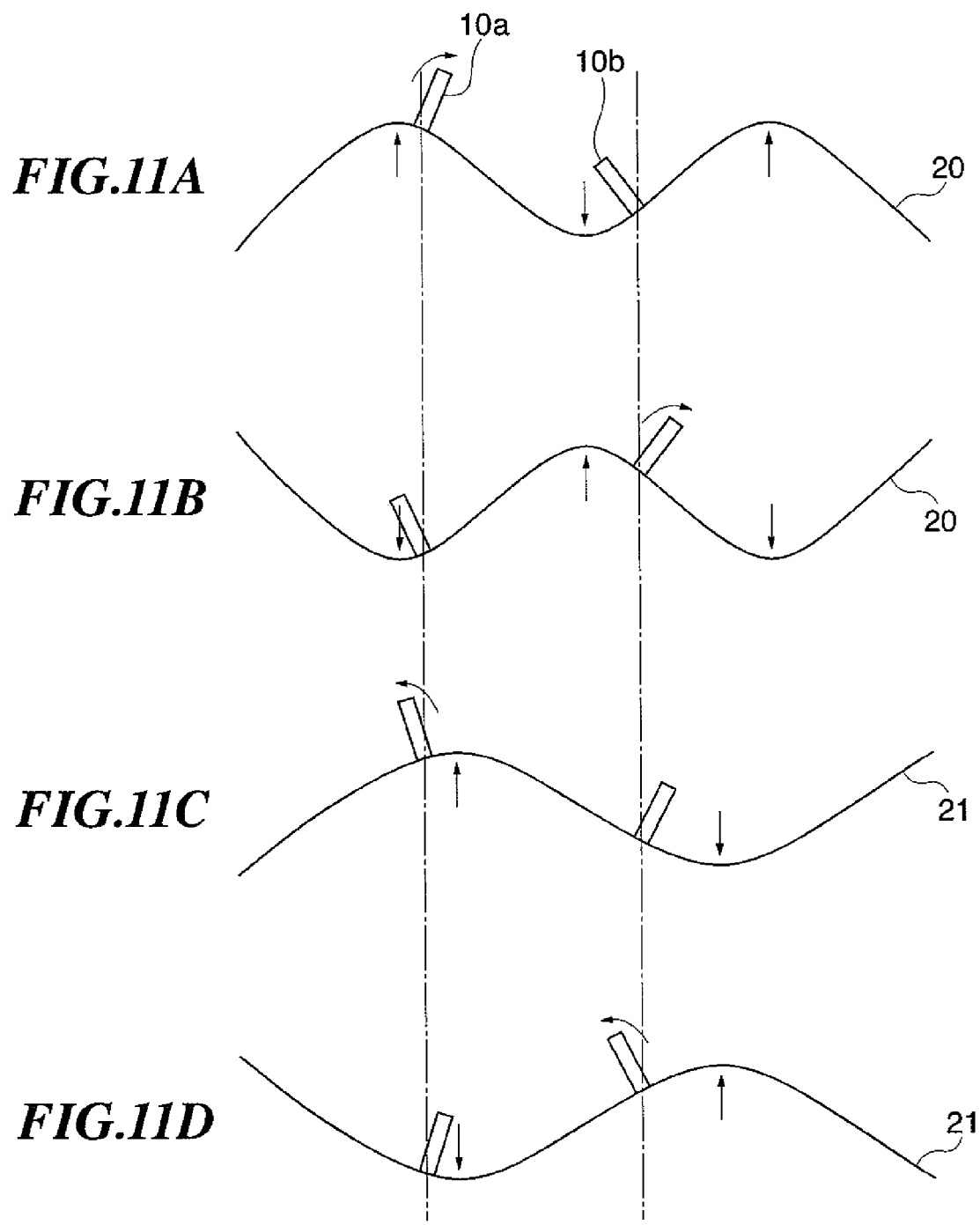

FIGS. 11A and 11B show the motion loci of the contact members 10*a*, 10*b* observed when the elastic member 8 performs a third-order bending vibration. FIGS. 11C and 11D show the motion loci of the contact members 10*a*, 10*b* observed when the elastic member 8 performs a second-order bending vibration. It should be noted that FIGS. 11A and 11C correspond to the excitation signal PA, whereas FIGS. 11B and 11D correspond to the excitation signal PB.

In a case where the elastic member 8 performs a third-order bending vibration as shown in FIGS. 11A and 11B, when the vibration occurs in the direction of lifting up the movable member 22, the contact members 10*a*, 10*b* are inclined in the direction from left to right. With this inclination, the movable member 22 in pressure contact with the contact members 10*a*, 10*b* is caused to move in the direction from left to right. On the other hand, when the vibration occurs in a direction away from the movable member 8, the contact members 10*a*, 10*b* are inclined in the direction from right to left. In this case, the contact members 10*a*, 10*b* are not made in contact with the movable member 22 and therefore do not affect the movement of the movable member 22.

In a case where the elastic member 8 performs a second-order bending vibration as shown in FIGS. 11C and 11D, when the vibration occurs in the direction of lifting up the movable member 22, the contact members 10a, 10b are inclined in the direction from right to left. With this inclination, the movable member 22 is caused to move in the direction from right to left. On the other hand, when the vibration occurs in a direction away from the movable member 22, the contact members 10a, 10b are inclined in the direction from left to right. In this case, the contact members 10a, 10b are not in contact with the movable member 22 and do not affect the movement of the movable member 22.

As apparent from the foregoing description, in the third embodiment, the moving direction of the movable member 8 can be switched by changing the vibration mode of the elastic member 8 between third- and second-order bending vibrations.

Fourth Embodiment

Figure 12:
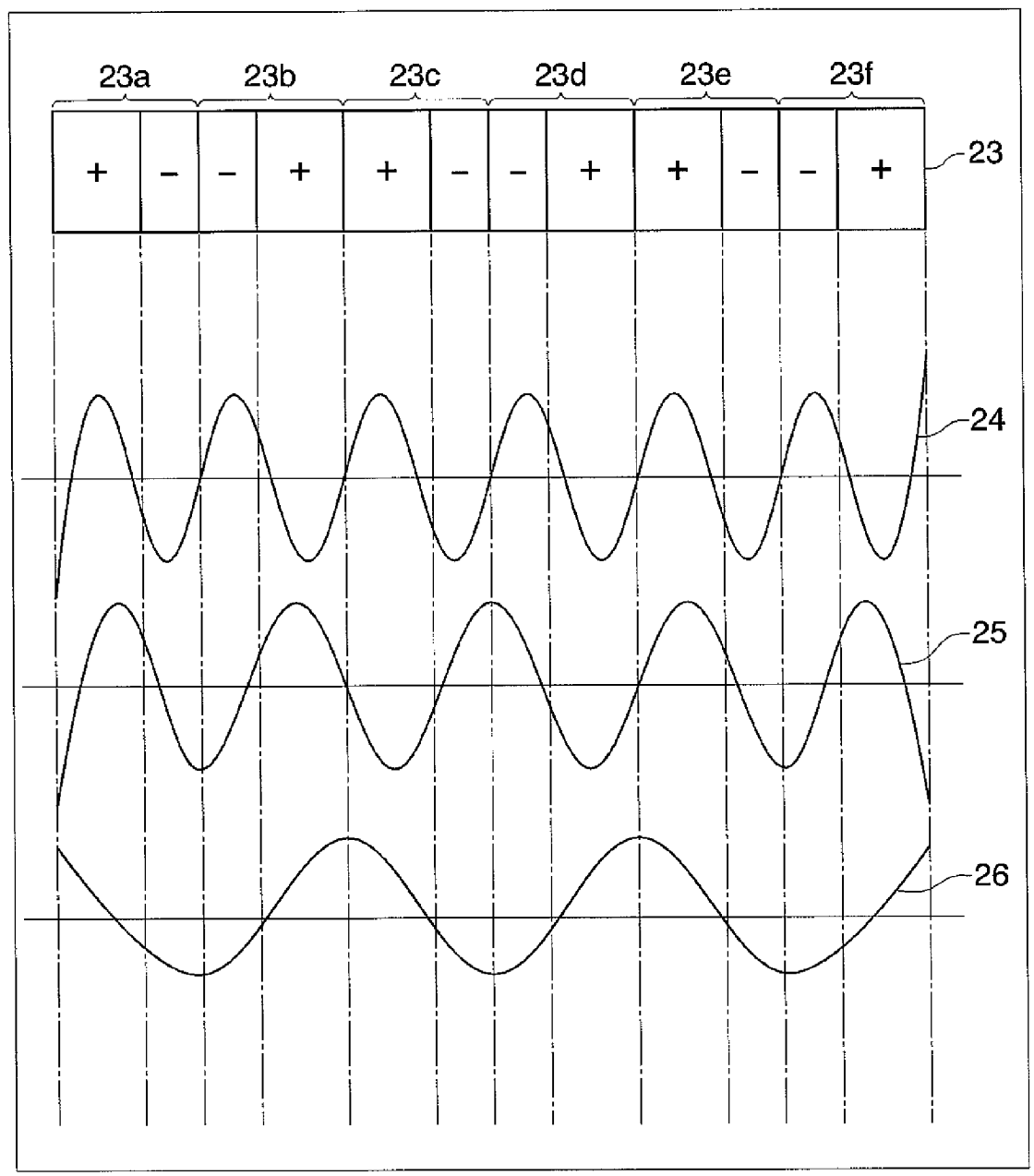
FIG. 12 is a view showing an electrode pattern of a piezoelectric element in a fourth embodiment of the present invention.

FIG. 12 is a view showing an example of electrode groups of a piezoelectric element in a fourth embodiment. As shown in FIG. 12, the piezoelectric element 23 is formed with six electrode groups 23a to 23f. By applying alternating voltages to the electrode groups 23a to 23f in modes which will be described later, it is possible to attain three vibration waveforms 24 to 26, which are different from one another in the order of vibration. The vibration waveforms 24 to 26 represent vibration waveforms of bending vibrations of the piezoelectric element 23, which are switched by means of a driving circuit described later.

Figure 13:
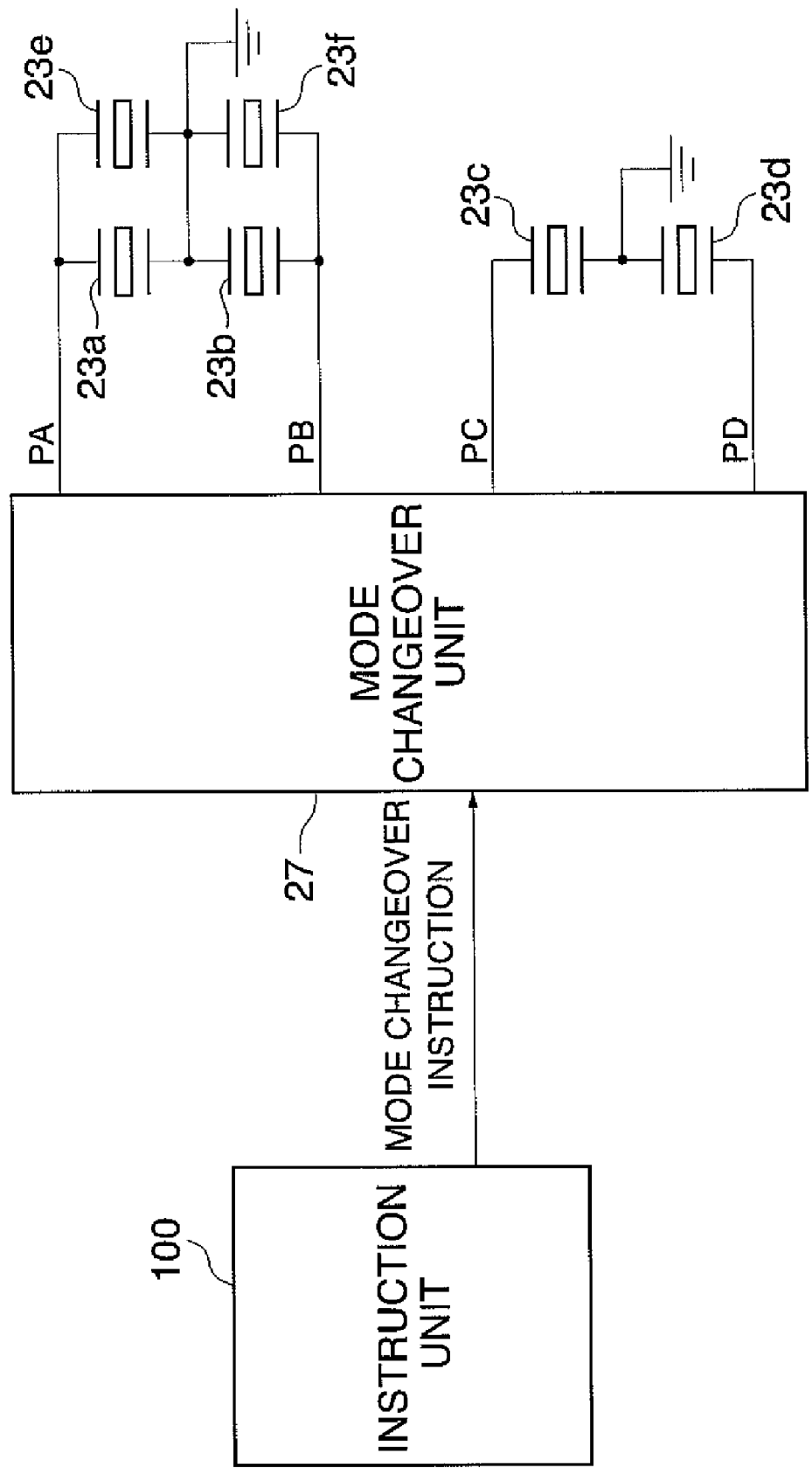
FIG. 13 is a block diagram showing a vibration mode changeover part of a vibration control apparatus according to the fourth embodiment.

FIG. 13 is a block diagram showing a vibration mode changeover part of a vibration control apparatus according to the fourth embodiment. This vibration control apparatus includes a mode changeover unit 27 adapted to switchingly generate three vibrations of different orders in accordance with a mode changeover instruction from an instruction unit 100.

The mode changeover unit 27 supplies an excitation signal PA to electrode groups 23a, 23e, and supplies an excitation signal PB to electrode groups 23b, 23f. Furthermore, the mode changeover unit 27 supplies an excitation signal PC to an electrode group 23c, and supplies an excitation signal PD to an electrode group 23d. At that time, in accordance with a mode changeover signal, the mode changeover unit 27 outputs alternating voltages of a frequency near a resonance frequency of each vibration mode.

FIG. 14 shows signs of phases of excitation signals PA, PB, PC, and PD for vibration modes of vibration waveforms 24 to 26.

Specifically, FIG. 14 indicates that the vibration wave form 26 can be attained when the phases of the excitation signals PA, PB, PC, and PD are in-phase with one another (positive sign).

FIG. 14 also indicates that the vibration waveform 25 can be attained when the excitation signals PA, PB are in-phase with each other and the excitation signals PC, PD are in-phase with each other, but the excitation signals PA, PB are anti-phase with the excitation signals PC, PD.

Furthermore, FIG. 14 indicates that the vibration waveform 24 can be attained when the excitation signals PA, PC are in-phase and the excitation signals PB, PD are in-phase, but the excitation signals PA, PC are anti-phase with the excitation signals PB, PD.

In the fourth embodiment, by controlling the phases of the voltages applied to the six electrode groups so as to make changeover of electrode polarity of each electrode group, the resultant electrode pattern is changed to a desired one that makes it easy to excite a desired vibration mode. It should be noted that the first to third embodiments use the same method as with the fourth embodiment, even though the number of electrode groups is different, to make changeover to an electrode pattern with which a desired vibration mode can easily be excited.

As a result, it is possible to make changeover of vibration modes even by means of a simple circuit construction without lowering vibration efficiency.

The present invention is not limited to being applied to the above described embodiments and is applicable to any element adapted to vibrate in response to application of an electromagnetic force, such as a magnetostrictive element, other than an electrostrictive element such as a piezoelectric element.

It is to be understood that the present invention may also be accomplished by supplying a system or an apparatus with a storage medium in which a program code of software, which realizes the functions of the above described embodiments is stored, and causing a computer (or CPU or MPU) of the system or apparatus to readout and execute the program code stored in the storage medium.

In this case, the program code itself read from the storage medium realizes the functions of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, a DVD+RW, a magnetic tape, a nonvolatile memory card, and a ROM.

Further, it is to be understood that the functions of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-240657, filed Sep. 5, 2006, which is hereby incorporated by reference herein in its entirety.

What is claimed is:

1. A vibration control apparatus for controlling vibration of a vibration member having an electrostrictive element adapted to be excited when applied with alternating voltages, comprising:

an instruction unit adapted to give an instruction to specify at least one of a plurality of orders of vibration mode in which the vibration member vibrates, wherein a vibration waveform of the at least one of the plurality of orders of vibration mode to be specified by said instruction unit has a plurality of vibration anti-node positions on the vibration member; and a changeover unit adapted to change over phases of alternating voltages applied to a plurality of electrode groups in accordance with the at least one of the plurality of orders of vibration mode specified by said instruction unit, the plurality of electrode groups being grouped from a plurality of electrodes formed on the electrostrictive element and polarized into respective polarities, each of said electrode groups being comprised of at least one electrode and at least one other electrode which are different in polarity from each other;

wherein at least one of the plurality of electrodes are respectively provided in a vicinity of each of the plurality of vibration anti-node positions.

2. The vibration control apparatus according to claim 1, wherein said changeover unit changes the phases of the alternating voltages to have a phase difference of zero or a constant phase difference therebetween in accordance with the order of vibration specified by said instruction unit.

3. The vibration control apparatus according to claim 2, wherein said changeover unit changes the phases of the alternating voltages to have a phase difference of 90 degrees or 180 degrees therebetween in accordance with the order of vibration specified by said instruction unit.

4. The vibration control apparatus according to claim 1, wherein a boundary between adjacent electrodes belonging to a same electrode group and having different polarities is positioned between nodes of vibration waveforms of different orders of vibration.

5. The vibration control apparatus according to claim 1, wherein the electrodes belonging to a same electrode group are collectively formed in a given region on the electrostrictive element.

6. The vibration control apparatus according to claim 1, wherein electrodes which belong to different electrode groups are mixedly formed in a given region of the electrostrictive element.

7. The vibration control apparatus according to claim 1, wherein at least one electrode of each electrode group disposed adjacent to at least one electrode of another electrode group has a same polarity as the at least one electrode of the other electrode group.

8. An vibration control method for controlling vibration of a vibration member having an electrostrictive element adapted to be excited when applied with alternating voltages, comprising:

specifying at least one of a plurality of orders of vibration mode in which the vibration member vibrates with an instruction unit, wherein a vibration waveform of the at least one of the plurality of orders of vibration mode to be specified with the instruction unit has a plurality of vibration anti-node positions on the vibration member; and generating vibrations of different orders by changing over phases of alternating voltages applied to a plurality of electrode groups with a changeover unit in accordance with the at least one of the plurality of orders of vibration mode specified by the instruction unit, wherein the plurality of electrode groups are grouped from a plurality of electrodes formed on the electrostrictive element and polarized into respective polarities, each of the electrode groups being comprised of at least one electrode and at least one other electrode which are different in polarity from each other, and wherein at least one of the plurality of electrodes are respectively provided in a vicinity of each of the plurality of vibration anti-node positions.

* * * * *